(12) United States Patent
Saiga et al.

(10) Patent No.: US 10,448,743 B2
(45) Date of Patent: Oct. 22, 2019

(54) CRIP AND CORD

(71) Applicant: YKK Corporation, Tokyo (JP)

(72) Inventors: Shinsuke Saiga, Tokyo (JP); Tetsuya Yoshino, Tokyo (JP); Yoshitomo Iyoda, Tokyo (JP)

(73) Assignee: YKK Corporation (JP)

(*) Notice: Subject to any disclaimer, the term of this patent is extended or adjusted under 35 U.S.C. 154(b) by 0 days.

(21) Appl. No.: 16/107,527

(22) Filed: Aug. 21, 2018

(65) Prior Publication Data

US 2018/0352962 A1 Dec. 13, 2018

Related U.S. Application Data

(63) Continuation of application No. 14/909,560, filed as application No. PCT/JP2013/072846 on Aug. 27, 2013.

(51) Int. Cl.
*B60N 2/58* (2006.01)
*F16B 2/20* (2006.01)
(Continued)

(52) U.S. Cl.
CPC .............. *A47C 7/24* (2013.01); *A47C 31/023* (2013.01); *B60N 2/58* (2013.01); *B60N 2/5825* (2013.01); *B68G 7/12* (2013.01); *F16B 2/22* (2013.01)

(58) Field of Classification Search
CPC ...... A47C 7/24; A47C 31/023; B60N 2/5825; B60N 2/58
See application file for complete search history.

(56) References Cited

U.S. PATENT DOCUMENTS 6,668,429 B2 * 12/2003 Fujisawa .............. A47C 31/023
24/297
7,444,792 B2 * 11/2008 Matson ................... E04D 12/00
24/336

(Continued)

FOREIGN PATENT DOCUMENTS

JP 2012-217754 A 11/2012
JP 3186511 U 10/2013
(Continued)

OTHER PUBLICATIONS

International Search Report, PCT Application No. PCT/JP2013/072846, dated Nov. 19, 2013.
(Continued)

*Primary Examiner* — Jason W San
(74) *Attorney, Agent, or Firm* — Kilpatrick Townsend & Stockton LLP

(57) ABSTRACT

A clip has an engagement portion including: a first arm with a first claw at the top end side; a second arm with a second claw at the top end side; and a bottom provided at the respective base end sides of the first arm and the second arm. Projections of the first claw and the second claw defines a left-right width of a mouth. A third claw projects into the retaining space at a position closer to the base end of the first arm, and a fourth claw is provided which projects into the retaining space at a position closer to the base end of the second arm. The third claw is narrower than the first claw in their widths along a front-back direction orthogonal to the depth direction of the retaining space extending from the mouth to the bottom and the left-right width direction of the mouth.

17 Claims, 10 Drawing Sheets

(51) Int. Cl.
*A47C 7/24* (2006.01)
*B68G 7/12* (2006.01)
*A47C 31/02* (2006.01)
*F16B 2/22* (2006.01)

(56) References Cited

U.S. PATENT DOCUMENTS

| | | | | |
|---|---|---|---|---|
| 8,857,018 | B2* | 10/2014 | Murasaki | A47C 31/023 24/297 |
| 9,526,302 | B2* | 12/2016 | Saiga | B60N 2/5825 |
| 9,663,007 | B2* | 5/2017 | Murasaki | B60N 2/5825 |
| 9,743,777 | B2* | 8/2017 | Saiga | A47C 31/023 |
| 9,827,890 | B2* | 11/2017 | Saiga | B60N 2/5825 |
| 9,834,431 | B2* | 12/2017 | Agonia | B60N 2/5825 |
| 2003/0213105 | A1* | 11/2003 | Bednarski | B60N 2/5825 24/289 |
| 2005/0006944 | A1* | 1/2005 | Ali | B60N 2/5825 297/452.6 |
| 2009/0140569 | A1* | 6/2009 | Mashimo | B60N 2/5825 297/452.59 |
| 2012/0284974 | A1* | 11/2012 | Yamamoto | A47C 31/023 24/458 |
| 2013/0117973 | A1* | 5/2013 | Murasaki | A47C 31/023 24/581.11 |
| 2014/0352117 | A1* | 12/2014 | Murasaki | A47C 31/023 24/581.11 |
| 2016/0264030 | A1* | 9/2016 | Saiga | B60N 2/5825 |
| 2016/0280106 | A1* | 9/2016 | Sato | B60N 2/6027 |
| 2017/0305316 | A1* | 10/2017 | Lafferty | B60N 2/5825 |

FOREIGN PATENT DOCUMENTS

| | | | |
|---|---|---|---|
| WO | 2008/050393 A1 | 5/2008 | |
| WO | 2012/017986 A1 | 2/2012 | |
| WO | WO-2012017986 A1 * | 2/2012 | ........... A47C 31/023 |
| WO | 2013/069114 A1 | 5/2013 | |

OTHER PUBLICATIONS

International Preliminary Report on Patentablility, PCT Application No. PCT/JP2013/072846, dated Mar. 10, 2016.
Restriction Requirement, U.S. Appl. No. 14/909,560, dated Sep. 21, 2017.
Non-Final Office Action, U.S. Appl. No. 14/909,560, dated Dec. 22, 2017.
Final Office Action, U.S. Appl. No. 14/909,560, dated Jun. 19, 2018.

* cited by examiner

CRIP AND CORD

This application is a continuation of U.S. application Ser. No. 14/909,560 which is a national stage application of PCT/JP2013/072846, both of which are incorporated herein by reference.

TECHNICAL FIELD

The present disclosure relates to a clip and a cord.

BACKGROUND ART

Patent literature 1 discloses a clip used for stretching and attaching a cover member to a cushion and so on. As shown in FIG. 3 of the same literature, a guide bar 13 is coupled to a side of a chuck 11, thereby enough flection of the guide bar 13 can be ensured. Such sufficient flection of the guide bar 13 may allow the wire to be more easily introduced into the hook 12 as understandable from FIGS. 6 and 7 of the same literature. Moreover, the hook 12 is coupled to a bottom side of the chuck 11 so that linear application of load to the clip 10 may be secured at a situation shown in FIGS. 2 and 7 and so on.

Patent literature 2 discloses a structure of a cord to be grasped by clips. As shown in FIG. 1 of the same literature, the block portions are coupled together by a joint 71 so that the longitudinal flexibility of the cord 8 shown in FIG. 1 may be secured.

CITATION LIST

Patent Literature

[PTL 1] International Publication No. 2012/017986
[PTL 2] International Publication No. 2013/069114

SUMMARY OF INVENTION

Technical Problem

Molded resin portion of the cord may be surely grasped by engagement portion of the clip so that disengagement of the molded resin portion from the engagement portion may be prevented. However, simply narrowing the interspace between a pair of arms configuring the engagement portion might possibly deteriorate easier insertion of the molded resin portion into the engagement portion, for example.

The present inventor has newly discovered a technical problem; the disengagement of the engaged portion from the engagement portion of clip can be prevented without greatly deteriorating the insertion easiness of the engaged portion into the engagement portion.

Solution to Problem

A clip according to one aspect of the present invention may be a clip (400) comprising: an engagement portion (405) comprising: a first arm (410) that is provided with a first claw (441) at the top end side of the first arm (410); a second arm (420) that is provided with a second claw (442) at the top end side of the second arm (420); and a bottom (406) that is provided at the respective base end sides of the first arm (410) and the second arm (420). The first claw (441) of the first arm (410) projects toward the second arm (420). The second claw (442) of the second arm (420) projects toward the first arm (410). The first claw (441) and the second claw (442) face each other at least partially. The respective projections of the first claw (441) and the second claw (442) defines a left-right width (W450) of a mouth (450) for allowing insertion of an engaged portion (350) into a retaining space (430) of the engagement portion (405). The first arm (410) further comprises a third claw (443) projecting into the retaining space (430) at a position closer to the base end of the first arm (410) than the first claw (441). The second arm (420) further comprises a fourth claw (444) projecting into the retaining space (430) at a position closer to the base end of the second arm (420) than the second claw (442). The third claw (443) and the fourth claw (444) are narrower than the first claw (441) and the second claw (442) respectively in their widths along a front-back direction that is orthogonal to the depth direction of the retaining space (430) extending from the mouth (450) to the bottom (406) and the left-right width direction of the mouth (450).

Preferably, the first arm (410) and the second arm (420) each may have the front-back width in the front-back direction, and the third claw (443) and the fourth claw (444) may be provided at the center of the front-back width of the first arm (410) and the second arm (420) respectively.

Preferably, the third claw (443) and the fourth claw (444) may face one another, and the interspace between the third claw (443) and the fourth claw (444) may become narrower as being away from the first claw (441) and the second claw (442).

Preferably, a first protrusion (461) may be provided at the facing surface of the first arm (410) facing the second arm (420), the first protrusion (461) protruding at a deeper level than the third claw (443) in the depth direction of the retaining space (430), and a second protrusion (462) may be provided at the facing surface of the second arm (420) facing the first arm (410), the second protrusion (462) protruding at a deeper level than the fourth claw (444) in the depth direction of the retaining space (430).

Preferably, the first arm (410) and the second arm (420) may be at least partially tapered, the first arm (410) and the second arm (420) being arranged closer at the bottom (406) side of the engagement portion (405) and being more distanced at the mouth (405) side.

Preferably, the clip may further comprise a hook (470) that is configured to retain a linear member (120) and is coupled to the engagement portion (405).

Preferably, the clip may further comprise a jig engagement portion (480) to which a jig for manipulating the clip (400) engages, the jig engagement portion (480) including: a coupled base (481) coupled to the hook (470); and an outer wall (482) extending from the coupled base (481) while forming an interspace between the hook (470) and the outer wall (482).

A cord according to another aspect of the present embodiment may be a cord (300) comprising: a molded resin portion (320) including an engaged portion (350) that is to be grasped by the engagement portion (405) of the clip (400) according to any one of above paragraphs; and a tape (310) at which the molded resin portion (320) is provided along at least one side edge of the tape (310), wherein the engaged portion (350) comprises: a first contact surface (331) with which the first claw (441) can be in contact; and a second contact surface (332) with which the second claw (442) can in contact, wherein a first groove (341) is formed at the first contact surface (331) and a second groove (342) is formed at the second contact surface (332), and wherein the third claw (443) can contact the bottom surface of the first groove (341) and the fourth claw (444) can contact the bottom surface of the second groove (324).

Preferably, the bottom surface of the first groove (341) may be smaller than the first contact surface (331), and the bottom surface of the second groove (324) may be smaller than the second contact surface (332).

Preferably, the engaged portion (350) may comprise a flange (370) that projects from a surface of the tape (310) and forms an interspace between the flange (370) and at least one of the first contact surface (331) and the second contact surface (332).

Preferably, a plurality of first grooves (341) and a plurality of second grooves (342) may be provided at the engaged portion (350) at a predetermined interval at the both sides of the tape (310).

Advantageous Effects of Invention

According to the present invention, the disengagement of the engaged portion from the engagement portion of clip can be sufficiently prevented without deteriorating the insertion easiness of the engaged portion into the engagement portion.

DESCRIPTION OF EMBODIMENTS

Hereinafter, exemplary embodiments of the present invention will be described with reference to drawings.

Respective embodiments are not mutually exclusive, and the skilled person could properly combine them without requiring excess descriptions and could understand the synergic effect by such combination. Overlapping descriptions among embodiments will basically omitted. Referenced drawings are mainly for illustrating the invention and may be simplified in an appropriate manner.

Figure 1:
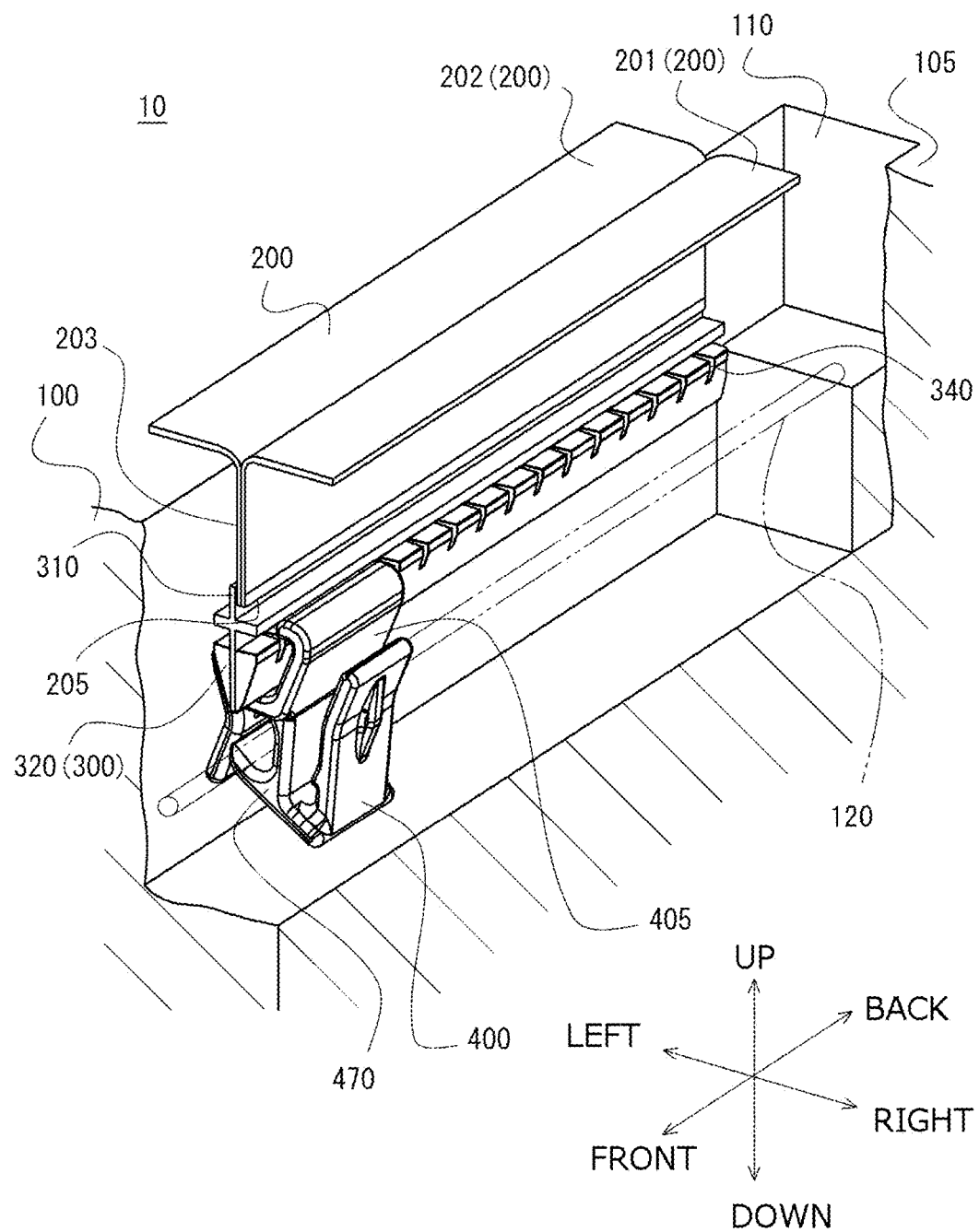
FIG. 1 is a perspective schematic view that illustrates a situation where a cord sewn to a cover member is hung, via a clip, to a wire in a groove of a cushion member. A situation is schematically shown where the cover member is pulled via the clip toward the wire at deeper level of the groove of the cushion member so that the cover member is stretched over the cushion member. Here, the clip and the cord are related to a first embodiment of the present invention.

For the sake of descriptions, terms indicating directions may be referred on the basis of an illustrated situation in FIG. 1. A front-back direction may be identical to an extending direction of a wire positioned at a deeper level in a groove of the cushion member, or may be identical to the extending direction of a side-edge of the cover member, or may be identical to an extending direction of the side-edge of the tape of the cord. Based on the following descriptions, the front-back direction may be recognized as a direction perpendicular to a depth direction of a retaining space extending from a mouth to a bottom and to a right-left width direction of the mouth between first and second claws. The depth direction of the retaining space of the engagement portion of the clip may be identical to an insertion direction of the engaged portion into the retaining space.

An up-down direction may be identical to the depth direction of the groove in the cushion member, or may be identical to a direction perpendicular to a surface of the cover member stretched over the cushion member, or may be identical to the suspension direction of the cord sewn to the cover member. Outward and inward may be related to left-right direction that is perpendicular to the front-back direction and the up-down direction where, on the basis of the groove of the cushion member, the inward being recognized as a direction directed to internal of the groove and the outward being recognized as a direction directed away from the groove. With respect to the left-right direction, on the basis of the retaining space of the engagement portion, internal may be recognized as a direction directed to internal of the retaining space, and the outward may be recognized as a direction directed away from the retaining space. Furthermore, those terms may be used in a different manner than those described above.

Manners how the clip and the cord are utilized should not be limited to those disclosed in FIG. 1 and so on, and they may be used differently. In this case, it would be not deniable that the above terms indicating directions defined based on FIG. 1 would possibly be not appropriate to be used as defined. However, the skilled person would understand that those terms indicating directions are solely for the sake of convenience, i.e. non-substantial, and would understand that those can be redefined based on the whole or the part of the appended drawings herewith.

<First Embodiment>

Figure 2:
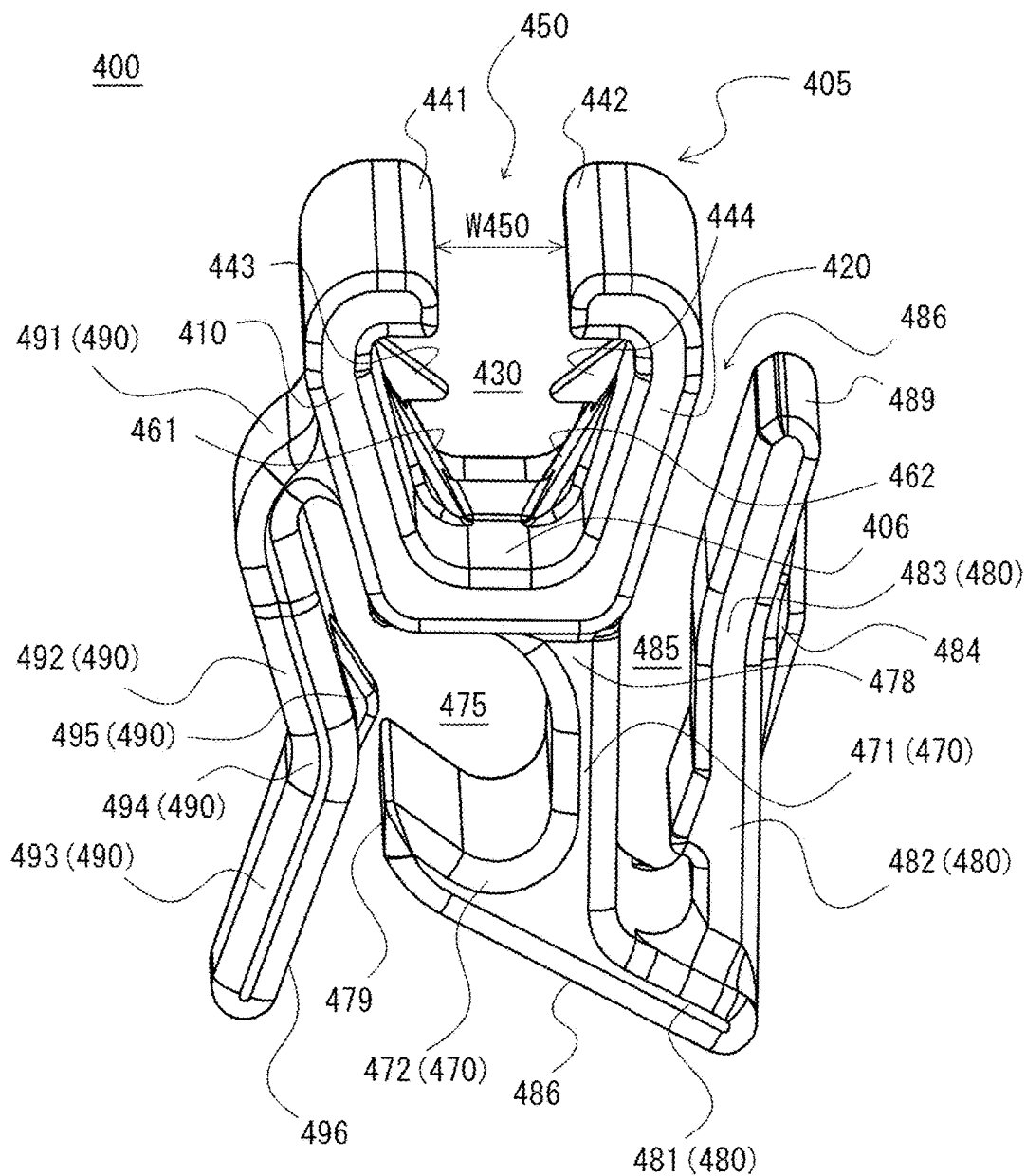
FIG. 2 is a perspective view of a clip according to the first embodiment of the present invention.
Figure 3:
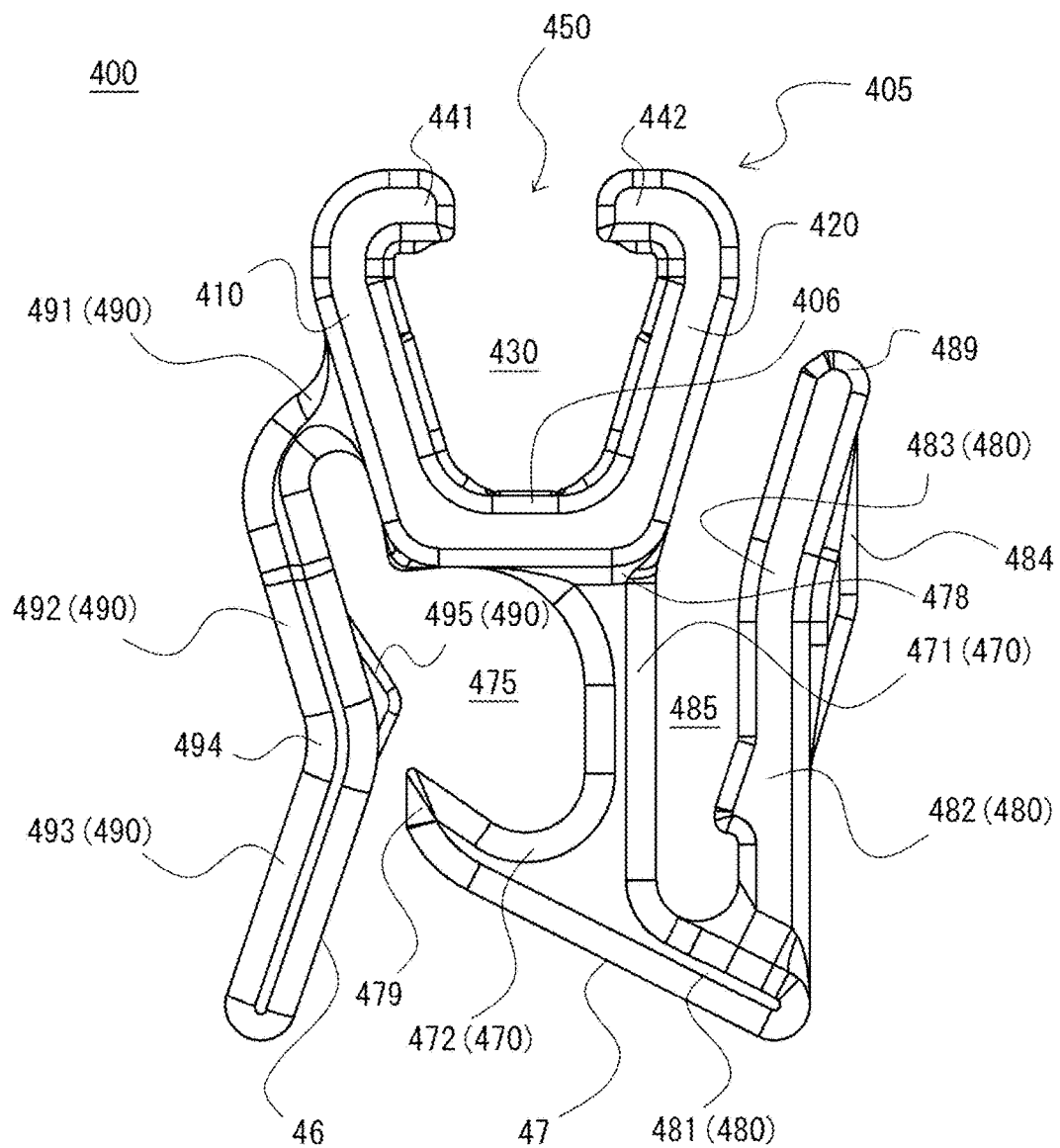
FIG. 3 is a side view of a clip according to the first embodiment of the present invention.
Figure 4:
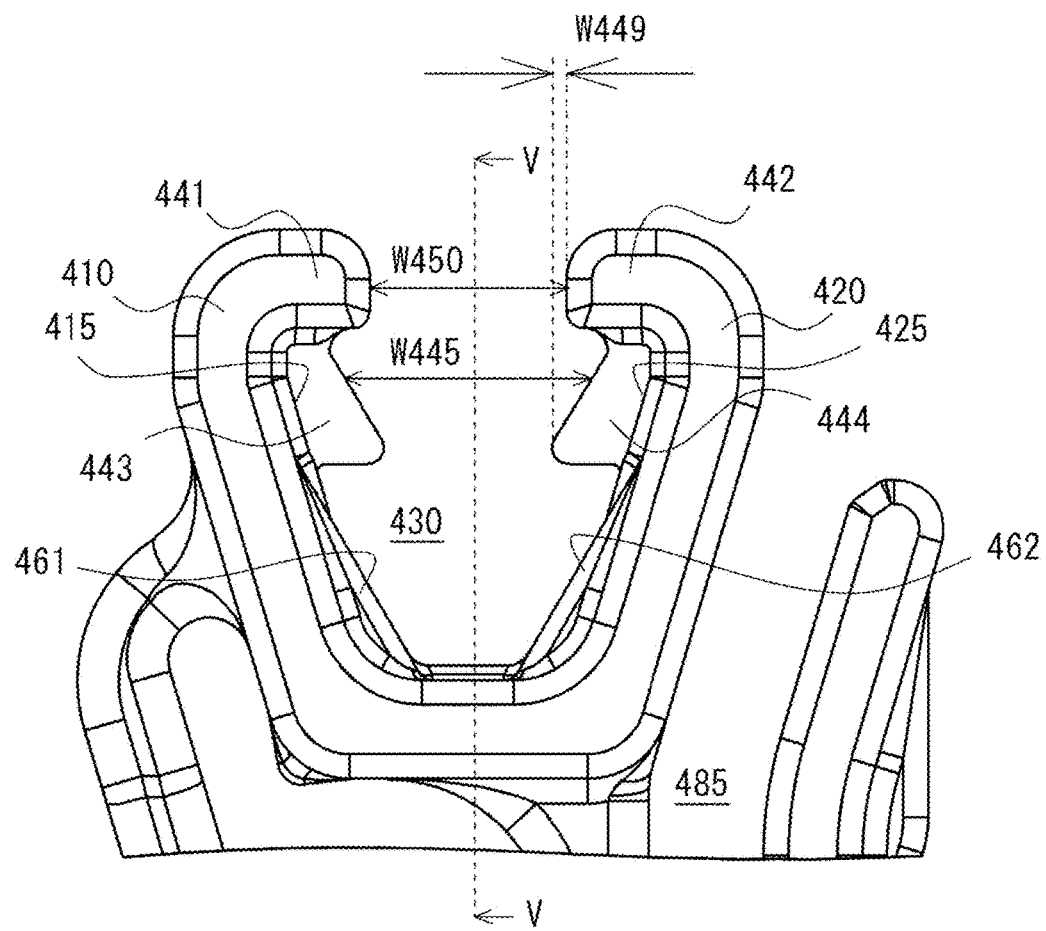
FIG. 4 is a partial side view of a clip according to the first embodiment of the present invention, particularly showing the engagement portion of the clip.
Figure 5:
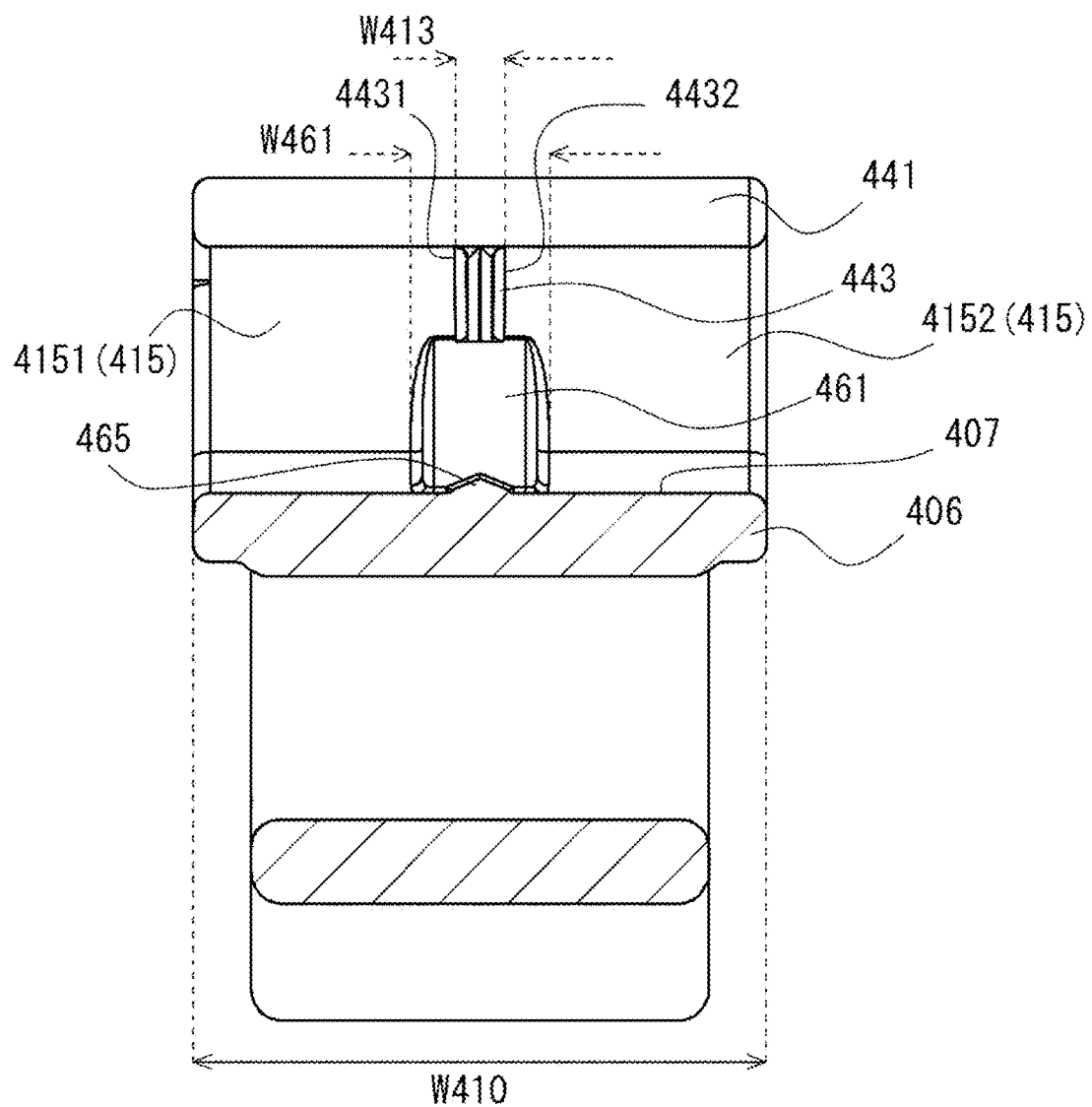
FIG. 5 is a schematic sectional view of a clip according to the first embodiment of the present invention, showing a section thereof where a first arm is viewed from a symmetry plane between the first and second arms shown in FIG. 4.
Figure 6:
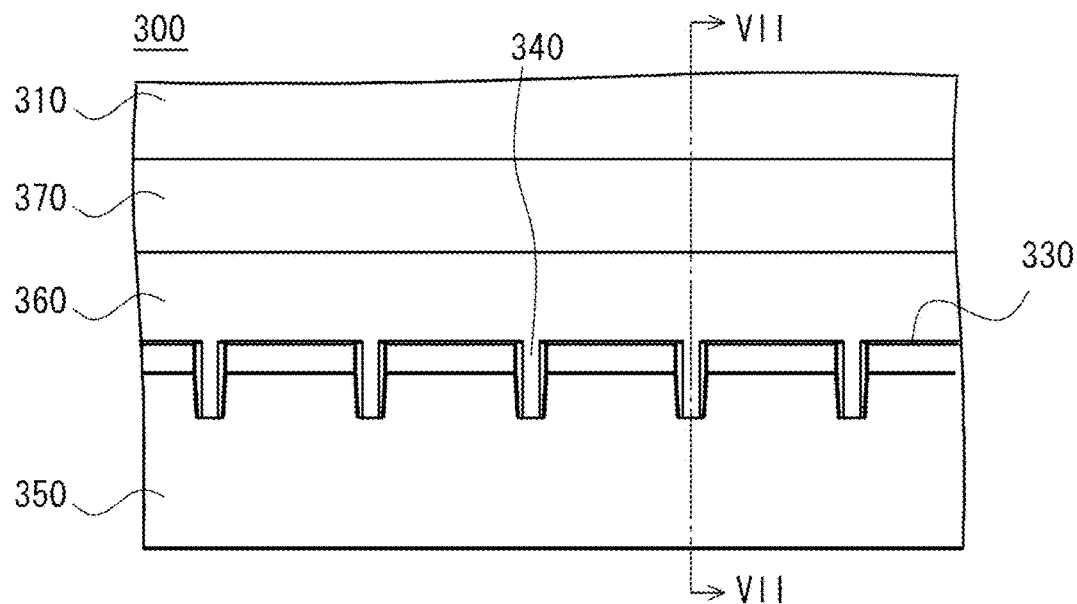
FIG. 6 is a side view of a cord according to the first embodiment of the present invention.
Figure 7:
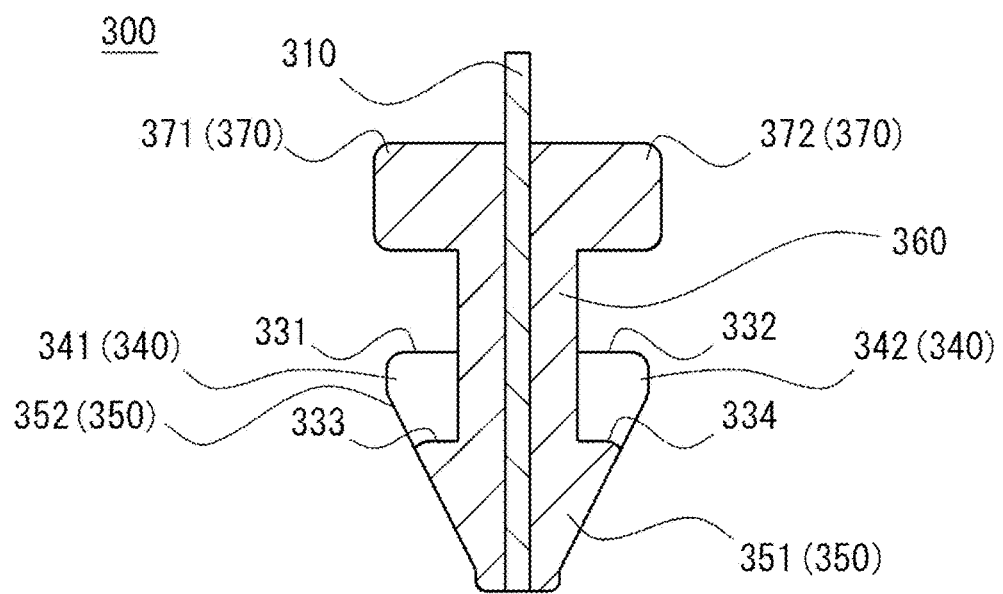
FIG. 7 is a sectional view of a cord according to the first embodiment of the present invention, showing a section taken along an alternate long and short dash line of VII-VII in FIG. 6.
Figure 8:
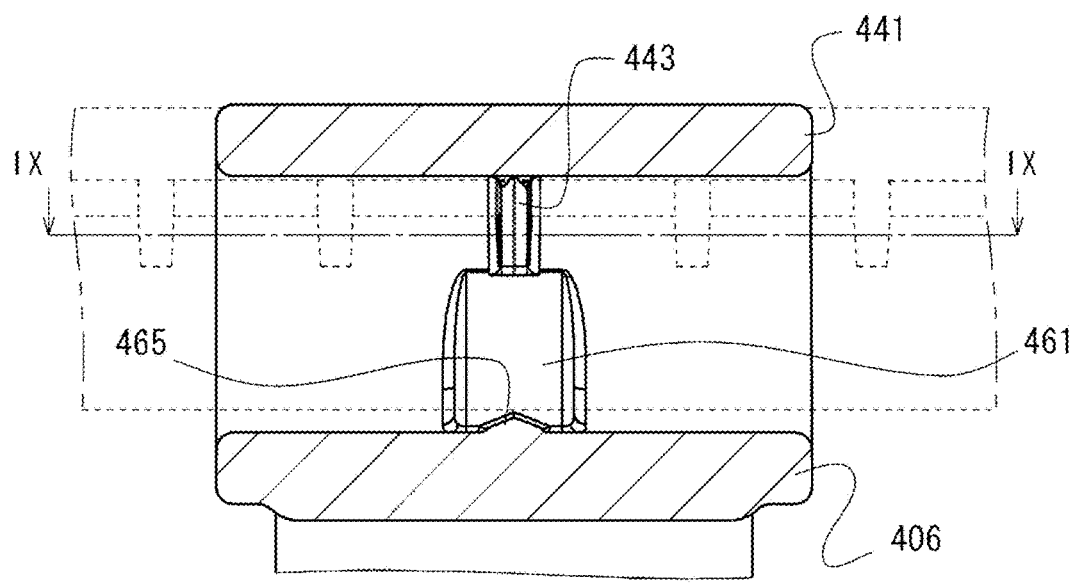
FIG. 8 is a sectional perspective view showing a situation where the molded resin portion of the cord shown in a dotted line is grasped by the engagement portion shown in a solid line.
Figure 9:
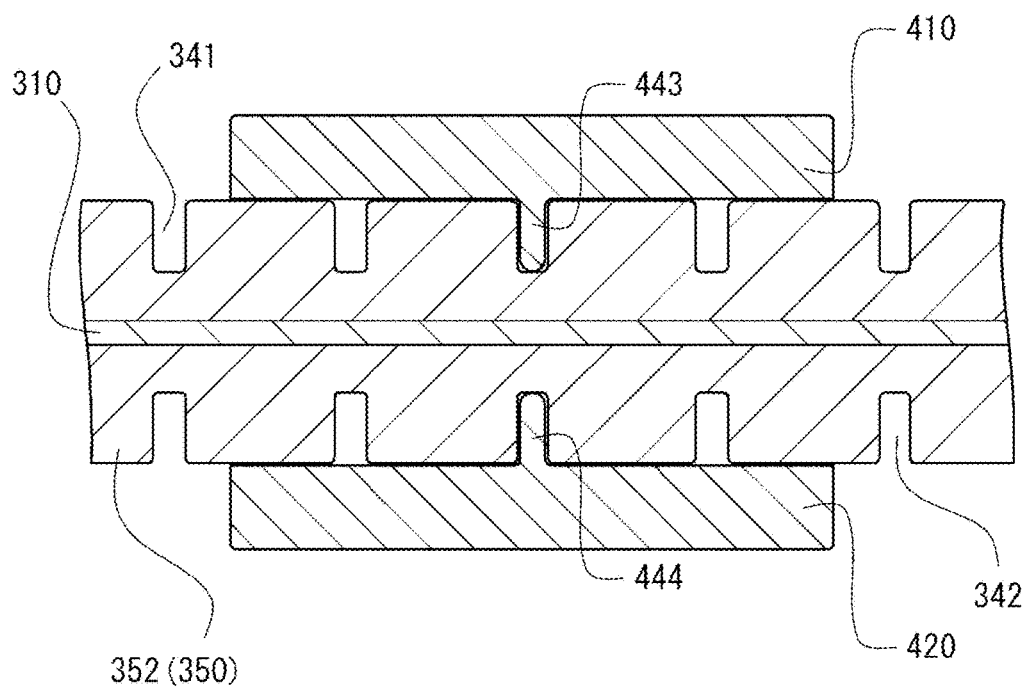
FIG. 9 is a sectional view of a section of the molded resin portion and the engagement portion taken along an alternate long and short dashed line of IX-IX in FIG. 8.
Figure 10:
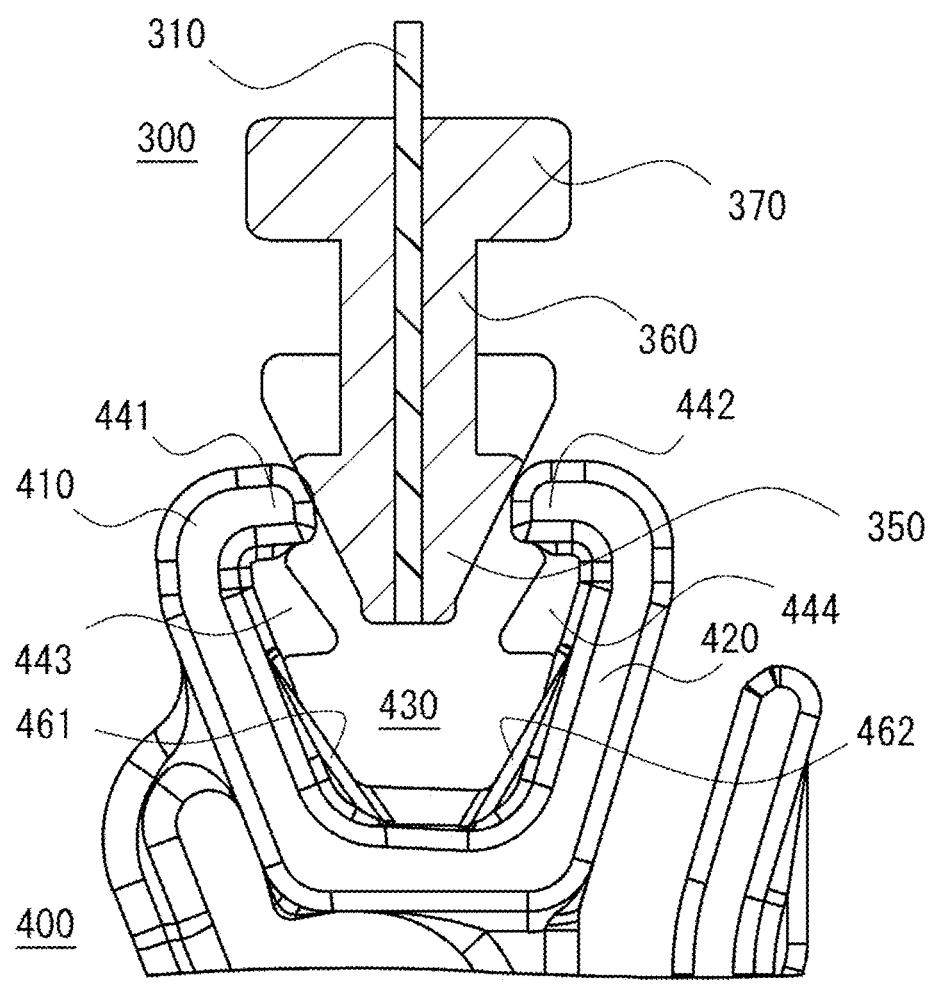
FIG. 10 is a schematic view illustrating a process through which the molded resin portion of the cord is fitted into the clip according to the first embodiment of the present invention.
Figure 11:
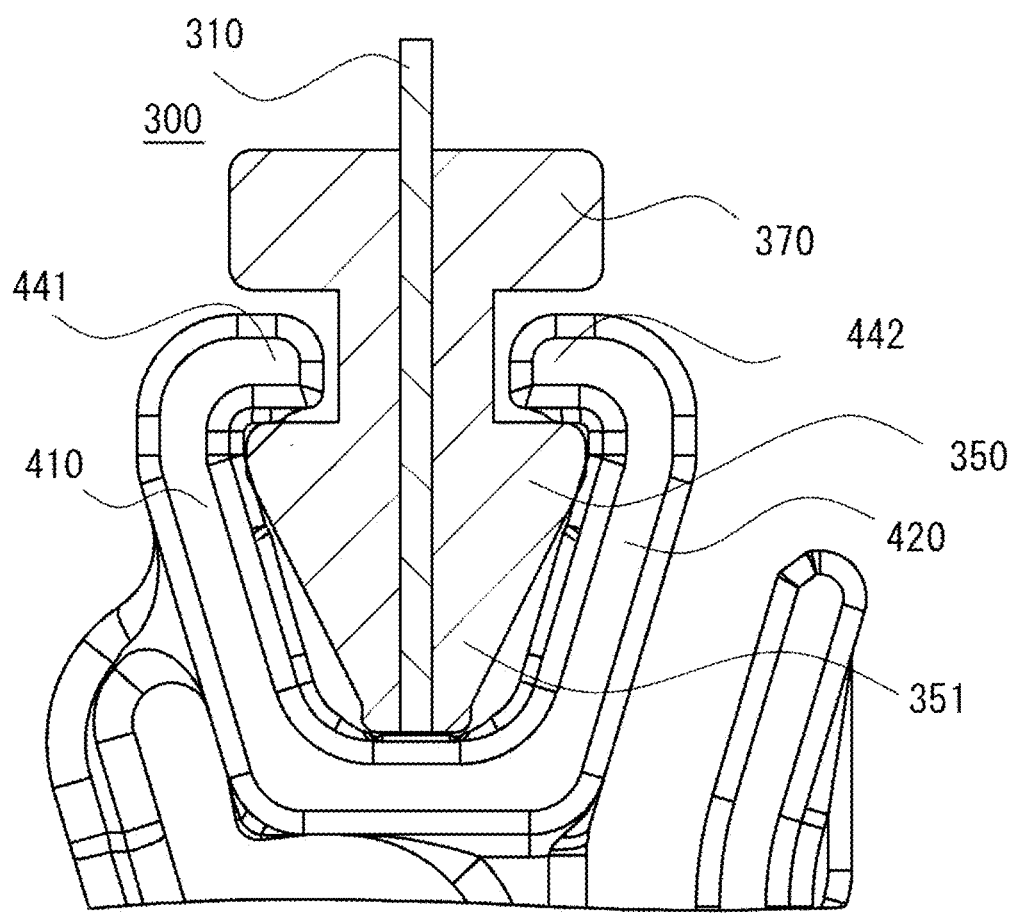
FIG. 11 is a schematic view showing a situation where the molded resin portion of the cord has been fitted into the clip according to the first embodiment of the present invention.
Figure 12:
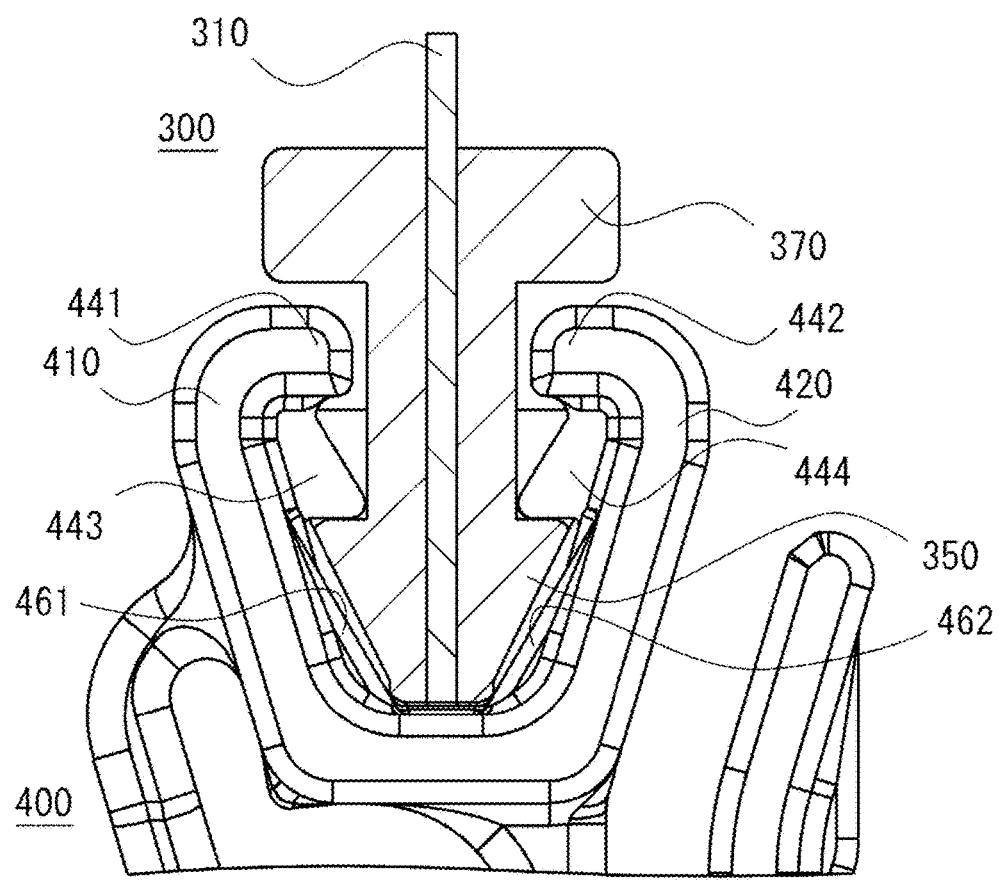
FIG. 12 is a schematic view showing a situation where the molded resin portion of the cord has been fitted into the clip according to the first embodiment of the present invention.

The first embodiment will be described with reference to FIGS. 1 to 12. FIG. 1 is a perspective schematic view that illustrates a situation where a cord sewn to a cover member is hung, via a clip, to a wire in a groove of a cushion member. A situation is schematically shown where the cover member is pulled via the clip toward the wire at deeper level of the groove of the cushion member so that the cover member is stretched over the cushion member. Here, the clip and the cord are related to a first embodiment of the present invention. FIG. 2 is a perspective view of a clip. FIG. 3 is a side view of a clip. FIG. 4 is a partial side view of a clip, particularly showing the engagement portion of the clip. FIG. 5 is a schematic sectional view of a clip, showing a section thereof where a first arm is viewed from a symmetry plane between the first and second arms shown in FIG. 4. FIG. 6 is a side view of a cord. FIG. 7 is a sectional view of a cord, showing a section taken along an alternate long and short dash line of VII-VII in FIG. 6. FIG. 8 is a sectional perspective view showing a situation where the molded resin portion of the cord shown in a dotted line is grasped by the engagement portion shown in a solid line. FIG. 9 is a sectional view of a section of the molded resin portion and the engagement portion taken along an alternate long and short dashed line of IX-IX in FIG. 8. FIG. 10 is a schematic view illustrating a process through which the molded resin portion of the cord is fitted into the clip. FIGS. 11 and 12 are schematic views showing a situation where the molded resin portion of the cord has been fitted into the clip.

As shown in FIG. 1, an elongated groove 110 in front-back direction is formed at a surface 105 of a thick rebounding cushion member 100 with multiple pores. A wire 120 of twisted metal wire and so on is laid at a deeper level in the groove 110, and the wire 120 is being stretched without being slackened. The wire 120 may be curved or bent in some embodiments.

It would be preferable to cover the cushion member 100 with the stretched cover member 200 from a view-point of enhanced protection and appearance of the cushion member 100. Especially, the stretched cover member 100 on the cushion member 100 may preferably be provided with no wrinkle and no slack. The cover member 200 may be a sheet made of artificial leather or natural leather or fabric and having flexibility and softness, and may be able to flexibly cover not only a flat surface but also a curved surface of the cushion member 100.

The cover member 200 may be hung, via the cord 300 and clip 400, to the wire 120 in the cushion member 100. Accordingly, the cover member 200 is pulled deeper and deeper in the groove 110 of the cushion member 100 and the cover member 200 is stretched over the surface of the cushion member 100. Within the illustration of FIG. 1, the cover member 200 has an overlapped part 203 in which a pair of discrete sheets 201, 202 are overlapped and fixed by sewing and so on. The bottom end 205 of the overlapped part 203 is fixed to a tape 310 of the cord 300 by sewing and so on. A cover member 200 of a single sheet can alternatively be fixed to the tape 310 of the cord 300 along its one side.

The cord 300 includes the tape 310 of a flexible sheet, and a molded resin portion 320 integrally provided to the tape 310. The tape 310 may typically be a fabric sheet, but it can be a resin sheet and so on having a predetermined thickness. The molded resin portion 320 may typically be integrally provided to the tape 310 by using a mold and so on. The molded resin portion 320 may be continuous along the front-back direction, but it can be split at predetermined interval along the front-back direction or it can be thinned at predetermined interval along the front-back direction.

Various manners for fixing the cord 300 and the cover member 200 may be adoptable. Typically, the top end part of the tape 310 and the bottom end part of the overlapped part 203 of the cover member 200 may be piled and sewn together continuously or intermittently along the front-back direction. Preferably, sewing may be utilized than gluing, as fixed state should be maintained against strong tensile force, not necessarily limited thereto though.

The cover member 200 may be attached to and stretched over the cushion member 100 as follows, for example. Firstly, the tape 310 of the cord 300 is fixed to the overlapped part 203 of the cover member 200 by sewing and so on. Next, the molded resin portion 320 provided at the bottom end of the cord 300 is grasped by the engagement portion 405 of the clip 400. While the clip 400 is attached to the cord 300, the clip 400 is inserted into the groove 110 of the cushion member 100, and the clip 400 catches the wire 120 and holds the wire 120 by its hook 470 inside. Relevant descriptions are presented in Patent literatures 1 and 2 regarding this procedure, and those disclosures of Patent literatures 1 and 2 are herein incorporated by reference.

As shown in FIGS. 2 to 4, the clip 400 includes the engagement portion 405, the hook 470, a jig engagement portion 480, and a hook closure 490. The clip 400 may typically be a molded resin piece shaped by a mold and so on, but not limited thereto. It may be made of metal or it may be a composite article of metal and resin. The clip 400 may be produced using 3D printers. However, injection molding may be preferable in light of production cost, production time and so on.

The engagement portion 405 may be a portion provided with a retaining space 430 for retaining the molded resin portion 320 of the cord 300 between the first arm 410 and the second arm 420 which are provided to face one another. The first arm 410 and the second arm 420 are arranged in a tapered manner where the bottom side is narrowed and the top side is widened. That is, they are closely arranged at the below-explained bottom 406 side and they are more distanced at the below-explained mouth 450 side. Accordingly, pivoting of each arm allowing the increase in the interspace of the first arm 410 and the second arm may be suitably ensured. It should be noted that the number of arms configuring the engagement portion 405 is arbitrary, and one or both of the first arm 410 and the second arm 420 can be divided into plural arms.

A first claw 441 is provided at the top end of the first arm 410. A second claw 442 is provided at the top end of the second arm 420. The first claw 441 projects toward the second claw 442, and the second claw 442 projects toward the first claw 441. The first arm 410 and the second arm 420 project by the same extent, and the first claw 441 and the second claw 442 are opposed. The front-back dimensions of the first arm 410 and the first claw 441 are identical, and the front-back dimension of the second arm 420 and the second claw 442 are identical. The mouth 450 is defined between the respective tips of the first claw 441 and the second claw 442, thereby allowing the insertion of the molded resin portion 320 into the retaining space 430 which is partially closed by the first claw 441 and the second claw 442 from above. The mouth 450 has a left-right width W450 defined by the respective projections of the first claw 441 and the second claw 442. The mouth 450 extends along the front-back direction which is perpendicular to both of the left-right width direction of the mouth 450 and the depth direction of the retaining space 430 extending from the mouth 450 toward the bottom 406. The depth direction of the retaining space 430 extending from the mouth 450 to the bottom 406 is identical to the insertion direction of the engaged portion 350 into the retaining space 430.

Specifically, the mouth 450 may be an elongated slit in the front-back direction, is greater than the left-right dimension of the engagement portion 405, and has front and back open ends. Moreover, it can be said that the front-back dimensions of the first claw 441 and the second claw 442 defining the mouth 450 are greater than the left-right dimension of the engagement portion 405. It should be noted that the projecting direction of the first claw 441 from the first arm 410 and the projecting direction of the second claw 442 from the second arm 420 are identical to a direction extending from the tip of the first claw 441 to the tip of the second claw 442 or an opposite direction thereof.

More specifically, the first arm 410 has a base end coupled to the bottom 406 of the engagement portion 405, the first arm 410 extending and sloping upward and outward from the base end, then being inwardly bent at its top end. This inward bending at the top end of the first arm 410 forms the first claw 441. The second arm 420 is similarly configured as the first arm 410, and the inward bending at the top end of the second arm 420 forms the second claw 442. The first claw 441 may be provided at the top side of the first arm 410 in a different manner than the inward bending of the top end of the first arm 410. Similarly, the second claw 442 may be provided at the top side of the second arm 420 in a different manner than the inward bending of the top end of the second arm 420.

The bottom 406 may be configured to be a flat plate, but not limited thereto. The engagement portion 405 may be configured in V-shape by coupling the base end of the first arm 410 and the base end of the second arm 420. In this case, the coupled portion between the base ends of the first and second arms 410, 420 configures the bottom 406. The bottom 406 where the base ends of the first and second arms 410, 420 couple may be recognized as a base portion of the engagement portion 405.

The dimensions of the first claw 441 and the second claw 442 in their projecting direction are formed to be relatively smaller than the dimensions of the first arm 410 and the second arm 420 extending along the up-down direction shown in FIG. 1, thereby the first arm 410 and the second arm 420 are easily deformable.

The retaining space 430 are surrounded by the first arm 410, the second arm 420, and the bottom 406. The retaining space 430 is defined from above by the first claw 441 at the top end of the first arm 410 and the second claw 442 at the top end of the second arm 420, and is open at the mouth 450 between the first claw 441 at the top end of the first arm 410 and the second claw 442 at the top end of the second arm 420. The retaining space 430 extends in an orthogonal direction to the paper face of FIG. 3, i.e. the front-back direction defined in this specification, and is open at its both ends in this direction. It should be noted that, in accordance with such a manner of the retaining space 430, said direction orthogonal to the paper face of FIG. 3 may be referred to as penetrating direction. The penetrating direction is equal to the front-back direction stated in this specification. The penetrating direction is orthogonal to the projecting direction of the above-described first claw 441 from the first arm 410 and the projecting direction of the second claw 442 from the second arm 420, and also is orthogonal to the insertion direction of the engaged portion 350 into the retaining space 430.

As specifically illustrated in FIG. 2 and FIG. 4, a third claw 443 is provided at the first arm 410, the a fourth claw 444 is provided at the second arm 420. The third claw 443 projects into the retaining space 430 below the first claw 441. In other words, the third claw 443 projects into the retaining space 430 at a deeper level than the first claw 441 in the depth direction of the retaining space 430 which is equal to the insertion direction of the molded resin portion 320 via the mouth 450. The fourth claw 444 projects into the retaining space 430 below the second claw 442. In other words, the fourth claw 444 projects into the retaining space 430 at a deeper level than the second claw 442 in the depth direction of the retaining space 430. Murasaki 986

According to such a configuration, the third claw 443 and the fourth claw 444 can surely prevent the molded resin portion 320 from coming off from the engagement portion 450 despite that the first arm 410 and the second arm 420 are configured not to greatly deteriorate the insertion easiness of the molded resin portion 320 into the engagement portion 405.

As shown in FIG. 4, the interspace W445 between the third claw 443 and the fourth claw 444 may preferably be narrower as being away from the first claw 441 and the second claw 442. As shown in FIG. 4, the interspace between the first claw 441 and the second claw 442 is equal to the left-right width W450 of the mouth 450. In contrast, the interspace W445 between the third claw 443 and the fourth claw 444 is maximum at directly below the first claw 441 and the second claw 442, and becomes gradually narrower as being away from the first claw 441 and the second claw 442. With such a manner, it may be avoided that the third claw 443 and the fourth claw 444 greatly disturb the insertion of the molded resin portion 320 into the engagement portion 405.

As shown in FIG. 4, the tip of the fourth claw 444 is inwardly positioned by a spacing W449 relative to the tip of the second claw 442. The same applies to the interrelation between the first claw 441 and the third claw 443. The inner end of the third claw 443 is inwardly positioned by a spacing W449 relative to the inner end of the first claw 441. Satisfying this condition may expectedly bring an enhanced ability for preventing the disengagement of the molded resin portion 320 from the engagement portion 405. For example, it is assumed that the molded resin portion 320 was pulled toward upward left oblique side when FIG. 4 is viewed in front. At this moment, the molded resin portion 320 is particularly disturbed by the fourth claw 444 and a leftward rotational force is given to the molded resin portion 320 when FIG. 4 is viewed in front, thereby disengagement of the molded resin portion 320 from the engagement portion 405 is prevented. It should be noted that a position of the tip of the above-described claws may be referred to as a position of inward end of the claws.

As shown in FIG. 2 and FIG. 5, the third claw 443 and the fourth claw 444 are configured narrower in the front-back direction relative to the first claw 441 and the second claw 442. More specifically, the respective front-back widths of the third claw 443 and the fourth claw 444 are sufficiently narrower than the respective front-back widths of the first claw 441 and the second claw 442. More particularly, the first claw 441 and the second claw 442 extend in the front-back direction in an elongated manner. In contrast, the third claw 443 and the fourth claw 444 are plates, more particularly flat-plates, still further thin-flat-plates, which have a thickness defined by a pair of surfaces orthogonal to the front-back direction.

With such a configuration, when the engagement portion 405 of the clip 400 is attached to the molded resin portion 320 of the cord 300, even the cord 300 was bent or twisted or a pulling force was applied to the cord 300 in the front-back direction, the disengagement of the molded resin portion 320 from the engagement portion 405 is preferably prevented by the third claw 443 and the fourth claw 444 which are narrower in the front-back direction than the first claw 441 and the second claw 442. Furthermore, according to such a configuration, the contact area of the third claw 443 and the fourth claw 444 against the molded resin portion 320 is minimized, thereby avoiding that the insertion of the molded resin portion 320 into the engagement portion 405 is greatly disturbed by the third claw 443 and the fourth claw 444.

As shown in FIG. 5, the third claw 443 according to the present example has a front surface 4431 and a back surface 4432 which are both orthogonal to the front-back direction.

The same holds true to the fourth claw 444 facing the third claw 443. The front surface 4431 and the back surface 4432 of the third claw 443 are counteract surfaces which counteract the movement of the clip 400 in the front-back direction. The displacement in the front-back direction of the molded resin portion 320 of the above-described cord 300 may be suitably prevented by the counteract surfaces of the third claw 443 and the counteract surfaces of the fourth claw 444. The third claw 443 and the fourth claw 444 may be arbitrarily arranged and possibly, may be integrally coupled to the first claw 441 and the second claw 442 respectively.

The clip 400 may be pulled and fixed between the cord 300 and the wire 120 and, under this situation, the possible displacement of the clip 400 along the wire 120 may be marginal. Suppressing the front-back displacement of the molded resin portion 320 of the cord 300 may expectedly contribute to a reliable maintenance of the initial state of the cover member 200 stretched over the cushion member 100.

Preferably, the third claw 443 and the fourth claw 444 may be positioned, respectively, at the center of the first arm 410 and the second arm 420 in their front-back width, not necessarily limited thereto through. According to such a configuration, positioning each the third claw 443 and the fourth claw 444 to the groove 340 at the molded resin portion 320 may be sensuously facilitated.

The inner surface 415 of the first arm 410 at the retaining space 430 side may have a frontward region 4151 positioned frontward of the front surface 4431 of the third claw 443 and a backward region 4152 positioned backward of the back surface 4432 of the third claw 443. The same holds true to the inner surface 425 of the second arm 420 at the retaining space 430 side, and it may have a frontward region positioned frontward of the front surface of the fourth claw 444 and a backward region positioned backward of the back surface of the fourth claw 444. Owing to both of the front and back surfaces each of the third claw 443 and the fourth claw 444, when the clip 400 being engaged with the cord 300, the clip 400 can endure a force which serves to disengage the clip 400 from the cord 300, thereby enhancing the sustainability of the engaged state. Here, the center in the front-back width may indicate that the dimension in the front-back direction frontwardly extending from the front surface 4431 of the third claw 443 is substantially equal to the dimension in the front-back direction backwardly extending from the back surface 4432. Similarly for the second arm 420, it may indicate that the dimension in the front-back direction frontwardly extending from the front surface of the fourth claw 444 is substantially equal to the dimension in the front-back direction backwardly extending from the back surface of the fourth claw 444.

As shown in FIG. 5, the third claw 443 is provided at the center in the front-back width W410 of the first arm 410. The front-back width W413 of the third claw 443 may be less than the front-back width W410 of the first arm 410, and may preferably be within 1/2 to 1/20 of the front-back width W410. The same holds true to the fourth claw 444 facing the third claw 443. In this example, the front-back width W410 of the first arm 410 is equal to the front-back width of the engagement portion 405.

Particularly, as shown in FIGS. 2, 4 and 5, the inner surface 415 of the first arm 410 facing the second arm 420 is provided with a first protrusion 461 protruding at a deeper level than the third claw 443 in the depth direction of the retaining space 430. Similarly, the inner surface 425 of the second arm 420 facing the first arm 410 is provided with a second protrusion 462 protruding at a deeper level than the fourth claw 444 in the depth direction of the retaining space 430.

According to such a configuration, the first protrusion 461 and the second protrusion 462 narrow the retaining space 430 at a deeper level, ensuring an enhanced sandwiching securement of the molded resin portion 320 by the engagement portion 405. The inner surfaces 415, 425 may be referred to as a facing surface. The dimensions in the front-back direction of the first protrusion 461 and the second protrusion 462 may be greater than the dimensions in the front-back direction of the third claw 443 and the fourth claw 444, and further may be less than the dimensions in the front-back direction of the first arm 410 and the second arm 420.

It may be preferable that the molded resin portion 320 is shaped to be downwardly narrowed such that the easier insertion into the engagement portion 405 may be secured. This feature may be more evident when the third claw 443 and the fourth claw 444 are provided at the engagement portion 405. However, this tapered shape of the molded resin portion 320 may possibly create a gap between the molded resin portion 320 and each of the first arm 410 and the second arm 420. In this embodiment, in light of this problem, the first protrusion 461 and the second protrusion 462 are provided directly below the third claw 443 and the fourth claw 444 in particular, allowing the molded resin portion 320 is to be pressed by the surrounding portions. This may accordingly contribute to strengthen the holding by the engagement portion 405 of the molded resin portion 320.

As shown in FIG. 5, the front-back width W461 of the first protrusion 461 may preferably be greater than the front-back width W413 of the third claw. In this case, the first protrusion 461 can inwardly push the molded resin portion 320 at a wider area. The same holds true to the second protrusion 462 facing the first protrusion 461. From a view point of ensuring the easier insertion of the molded resin portion 320 into the engagement portion 405, the front-back width W461 of the first protrusion 461 may preferably be less than the front-back width W410 of the first arm 410.

As shown in FIG. 5, a projection 465 may be provided at the bottom 406 of the engagement portion 405 which projects into the retaining space 430 between the first arm 410 and the second arm 420. According to such a configuration, the molded resin portion 320 may be upwardly pushed inside the retaining space 430 by the projection 465, surely ensuring the sandwiching of the molded resin portion 320 from above and below in corporation with each claw. The projection 465 may preferably be provided at the bottom surface 407 of the bottom 406 between the first protrusion 461 and the second protrusion 462.

As will be understood from above, the retaining space 430 below the third claw 443 and the fourth claw 444 is reduced by the first protrusion 461, the projection 465, and the second protrusion 462 on three sides, thereby ensuring sufficient holding of the molded resin portion 320 by the engagement portion 405.

The hook 470 may be a substantially J-shaped portion coupled to the engagement portion 405, and may be configured to be able to hold the wire 120 within the hook 470. The hook 470 may include a hook wall 471 coupled to the bottom surface of the bottom 406 of the engagement portion 405, and an arcuate portion 472 coupled to the bottom end of the hook wall 471. The hook wall 471 linearly downwardly extends from the bottom surface of the bottom 406 of the engagement portion 405. The arcuate portion 472 consists of a curved portion in an arc from the bottom end of the hook wall 471 and a sloped portion from the bottom end of the hook wall 471 toward the tip of the arcuate portion 472. The curved concave at the arcuate portion 472 faces the engagement portion 405.

The jig engagement portion 480 may be a portion to which a jig for manipulating the clip 400 can be engaged and, in particular it is provided outward of the hook 470 and defines a jig-insertion-space 485 with the hook 470 therebetween. In this example, the jig engagement portion 480 includes a coupled base 481 coupled to the arcuate portion 472 of the hook 470, and an outer wall 482 extending from the coupled base 481 to reach to the engagement portion 405 while defining a spacing in corporation with the hook wall 471 of the hook 470 and the engagement portion 405. The coupled base 481 downwardly and outwardly extends at a slant from the arcuate portion 472 of the hook 470. The outer wall 482 rises from the outer end of the coupled base 481 and linearly upwardly extends.

The base end of the jig engagement portion 480 is coupled to the arcuate portion 472 of the hook 470, deepening the depth of the jig-insertion-space 485 and hopefully ensuring the sufficient pivoting of the outer wall 482. As shown in FIG. 3, the tip 489 of the outer wall 482 sits next to the middle height in the up and down direction of the outer surface of the second arm 420 so that a jig-insertion-mouth 486 is formed between the outer surface of the second arm 420 and the tip 489 of the outer wall 482.

The outer wall 482 extends to form a uniform spacing across the outer surface of the hook wall 471 and the outer surface of the second arm 420 of the engagement portion 405. The second arm 420 is slightly outwardly tilted and is slant relative to the hook wall 471. Accordingly, the outer wall 482 is provided with a bent portion 483 next to the coupled position between the hook wall 471 and the second arm 420. The bent portion 483 is bent such that its convex faces the hook 470 side and the engagement portion 405 side. The bent portion 483 secures a sufficient spacing between the second arm 420 and the outer wall 482, thereby easier insertion of jigs into the jig-insertion-space 485 may be ensured. Furthermore, an outwardly protruding reinforcement protrusion 484 may be provided at the outer surface of the bent portion 483 so that reinforcement of the bent portion 483 can be ensured. Jigs fitted into the jig engagement portion 480 may, for example, be a flathead screw driver, but other types of jigs may be utilized.

The hook closure 490 may be configured to close the hook 470 and is positioned outward of the hook 470. In the present example, the opening of the hook 470 faces away from the jig engagement portion 480, and thus the hook closure 490 is oppositely arranged relative to the jig engagement portion 480. In other words, the hook 470 may be sandwiched by the hook closure 490 and the jig engagement portion 480.

The hook closure 490 may include a base 491, a closure wall 492, and a guide wall 493. The base 491 is a portion which is coupled to an outer surface of the first arm 410 of the engagement portion 405 and is downwardly curved. The closure wall 492 is a portion downwardly extending close to the opening of the hook 470. The guide wall 493 is a portion which downwardly extending and passing the tip end 479 of the hook 470 in order to ensure the easiness of grasping the wire 210.

The closure wall 492 and the guide wall 493 are coupled and bent outwardly so that a bent portion 494 is provided at this coupled portion. The convex of the coupled portion 494 faces the hook 470 side. The inner surface around the bent portion 494 is provided with a disengagement-preventing-protrusion 495 which is protruded to project toward the hook-internal space 475 of the hook 470. The wire 120 which has been entered into the hook-internal space 475 may be prevented by the disengagement-preventing-protrusion 495 from coming off out of hook.

The inner surface of the guide wall 493, i.e. the surface of the guide wall 493 at the hook 470 side may serve as a first guide surface 46 and guide the wire 120 external of the hook 470 into the hook 470. The second guide surface 47 may be configured by the coupled portion of the arcuate portion 472 of the hook 470 and the coupled base 481 of the jig engagement portion 480. The first guide surface 46 and the second guide surface 47 are oriented to mutually get closer toward the entrance for the wire between the hook 470 and the hook closure 490, thereby suitably guiding the wire 120 external of the hook 470 into the hook 470.

Here, references will be made particularly to FIGS. 6 to 9 in order to describe the cord 300. The cord 300 may be formed such that the molded resin portion 320 is integrally coupled to both surfaces of the bottom end of the flat thin tape 310. The molded resin portion 320 may be shaped by a mold and so on to be suitable for the insertion into the engagement portion 405 and to be suitably retained in the engagement portion 405. Corresponding to the third claw 443 and the fourth claw 444 provided at the engagement portion 405 as discussed above, the molded resin portion 320 is provided with grooves 340 which are provided at a predetermined interval at both sides of the tape 310 and to which each third claw 443 and fourth claw 444 is insertable.

The molded resin portion 320 according to the present example includes an engaged portion 350, a middle connecting portion 360, and a flange 370, which are provided on both paired main surfaces of the tape 310 and are configured symmetrically when the tape 310 is taken as a symmetry plane. The engaged portion 350 to be grasped by the engagement portion 405 may be a substantially upside-down triangle portion in section and includes a bottom portion 351 and a top portion 352. The bottom portion 351 is held between the third claw 443 and the bottom 406 and is held between the fourth claw 444 and the bottom 406. The top portion 352 is integrally formed above onto the bottom portion 351. The integrated portion of the bottom portion 351 and the top portion 352 is held between the first claw 441 and the bottom 406 and between the second claw 442 and the bottom 406.

The top portion 352 of the engaged portion 350 may be provided with a paired top surfaces 330 which extend in parallel in the front-back direction at both sides of the tape 310. A plurality of grooves 340 are provided at each top surface 330 with a predetermined interval along the front-back direction along one side edge of the tape 310. The groove 340 is provided for accommodating the third claw 443 or the fourth claw 444.

Referring to FIG. 7, the top portion 352 of the engaged portion 350 includes a first contact surface 331 with which the first claw 441 of the first arm 410 can be in contact, and a second contact surface 332 with which the second claw 442 of the second arm 420 can be in contact. A first groove 341 is formed at the first contact surface 331 and a second groove 342 is formed at the second contact surface 332. The third claw 443 can contact the bottom surface 333 of the first groove 341, and the fourth claw 444 can contact the bottom surface 334 of the second groove 342.

The middle connecting portion 360 may be configured to occlude the mouth 450 between the first claw 441 and the second claw 442 of the engagement portion 405. The flange 370 is coupled via the middle connecting portion 360 to the engaged portion 350. The flange 370 is projected from the main surface of the tape 310, and forms a spacing between the flange 370 and the engaged portion 350. The flange 370 is a portion with which a jig can engage for lowering the cord 300 toward the wire 120 located in the groove 110 of the cushion member 100.

As shown in FIGS. 8 and 9, at one side of the tape 310, the arrangement interval of grooves 340 provided at the engaged portion 350 is narrower than the front-back width of the engagement portion 405. Accordingly, the engagement portion 405 of the clip 400 can be positioned at an arbitrary position in the elongated engaged portion 350 in the front-back direction. Preferably, three or more grooves 340 may be provided at one side of the tape 310 within the front-back width of the engagement portion 405, and similarly three or more grooves 340 may be arranged at the other side of the tape 310.

A number of grooves 340 may be provided at the molded resin portion 320 at the both sides of the tape 310 so that any enhancement of flexibility of the molded resin portion 320 may be envisaged. In both sides of the tape 310, the respective grooves 340 at one side exist symmetrically to the respective grooves 340 at the other side when the tape 310 is taken as a symmetry plane so that geometric uniformity may be ensured. If the third claw 443 and the fourth claw 444 were arranged asymmetrically or not to be faced one another, the respective arrangement manner of the grooves 340 at both sides of the tape 310 may be shifted in the front-back direction.

References are now made to FIGS. 10 to 12 in order to describe the insertion of the engaged portion 350 of the molded resin portion 320 into the engagement portion 405. As shown in FIG. 10, the engaged portion 350 is configured to be narrower toward its bottom end side, and thus it can be inserted into the mouth 450 between the first claw 441 and the second claw 442 without any difficulty. The middle portion of the engaged portion 350 of the molded resin portion 320 in up and down direction may have a matched width with the left-right width W450 of the mouth 450, and the engaged portion 350 is required to be pushed into the engagement portion 405 in order to further lower the molded resin portion 320. The engaged portion 350 of the molded resin portion 320 may preferably be made of an elastic material and may elastically deform in response to an applied force when passing through the mouth 450.

When the molded resin portion 320 is pushed between the first arm 410 and the second arm 420 downwardly toward the bottom 406 via the mouth 450, the external surface of the engaged portion 350 of the molded resin portion 320 contacts the first arm 410 and the second arm 420, the outwardly pushed first arm 410 by the engaged portion 350 pivots around its base end clockwise when FIG. 10 is viewed in front, and similarly the second arm 420 pivots around its base end counterclockwise when FIG. 10 is viewed in front. As discussed above, the first arm 410 and the second arm 420 are close at the bottom 406 side and more distanced at the mouth 450 side. Accordingly, such respective arm pivoting in the opposite direction will be suitably ensured. Finally, the first arm 410 and the second arm 420 elastically recover to their original positions, and accordingly engage with and sandwich the engaged portion 350 of the molded resin portion 320 which has been inserted into the retaining space 430 through the mouth 450.

During the course of downward pushing of the molded resin portion 320, the engaged portion 350 of the molded resin portion 320 touches the third claw 443 and the fourth claw 444. As discussed above, the interspace between the third claw 443 and the fourth claw 444 is upwardly widened so that descending of the molded resin portion 320 is not greatly disturbed by the third claw 443 and the fourth claw 444. Further, each of the third claw 443 and the fourth claw 444 is a plate having a defined thickness by the pair of main surfaces orthogonal to the front-back direction. Accordingly, the contact area between the third claw 443 and the engaged portion 350 may be minimized, and similarly the contact area between the fourth claw 444 and the engaged portion 350 may be minimized, thus descending of the molded resin portion 320 being not greatly disturbed.

Being subjected to an applied force to the molded resin portion 320 to pass through the mouth 450 between the first claw 441 and the second claw 442, the bottom portion 351 of the engaged portion 350 may pass through the interspace between the third claw 443 and the fourth claw 444; may displace further downward from the third claw 443 and the fourth claw 444; and may finally hit the bottom 406 or the projection 465.

As shown in FIG. 11, the engaged portion 350 is sandwiched between the first claw 441 and the bottom 406, and is sandwiched between the second claw 442 and the bottom 406, thereby the engaged portion 350 is sufficiently retained by the engagement portion 405. There is a clearance between the first arm 410 and the bottom portion 351 of the engaged portion 350. Similarly, there is a clearance between the second arm 420 and the bottom portion 351 of the engaged portion 350.

As shown in FIG. 12, the bottom portion 351 of the engaged portion 350 is sandwiched between the third claw 443 and the bottom 406, and is sandwiched between the second claw 442 and the bottom 406, thereby the engaged portion 350 being sufficiently retained by the engagement portion 405. The first protrusion 461 decreases the clearance between the first arm 410 and the bottom portion 351 of the engaged portion 350. Similarly, the second protrusion 462 decreases the clearance between the second arm 420 and the bottom portion 351 of the engaged portion 350.

In view of the above descriptions, the skilled person could add various modifications to the respective embodiments. The reference numbers introduced in Claims are just for a reference, and should not be referenced in order to narrowly construe claims. The molded resin portion can be replaced by a metal block.

REFERENCE SIGNS LIST

400 Clip
405 Engagement portion
410 First arm
420 Second arm
430 Retaining space
441 First claw
442 Second claw
443 Third claw
444 Fourth claw
450 Mouth
470 Hook
480 Jig engagement portion
490 Hook closure

The invention claimed is:

1. A combination of a cord and one or more clips, said one or more clips each comprising:
left and right arms each including base and top ends, the left arm including a first claw and a third claw, and the right arm including a second claw and a fourth claw; and a bottom to which respective base ends of the left and right arms are coupled, the third claw positioned between the first claw and the bottom, and the fourth claw positioned between the second claw and the bottom, said cord comprising a tape and a molded portion attached to the tape, the molded portion including:

left and right top surfaces being arranged to sandwich the tape and to be covered at least partially by the first and second claws respectively;

left and right side surfaces extending away from the left or right top surface toward a bottom end of the molded portion;

one or more left grooves each being configured to receive the third claw when the clip and the cord are coupled, the left groove being formed at least on the left side surface and being provided with a left bottom surface;

one or more right grooves each being configured to receive the fourth claw when the clip and the cord are coupled, the right groove being formed at least on the right side surface and being provided with a right bottom surface;

one or more left portions each being configured to provide the left bottom surface so that the left portion is sandwiched between the third claw and the bottom of the clip when the clip and the cord are coupled; and one or more right portions being configured to provide the right bottom surface so that the right portion is sandwiched between the fourth claw and the bottom of the clip when the clip and the cord are coupled.

2. The combination of claim 1, wherein the third claw is coupled to the first claw, and the fourth claw is coupled to the second claw, and wherein the left groove is formed on the left top surface and the left side surface, and the right groove is formed on the right top surface and the right side surface.

3. The combination of claim 1, wherein the molded portion further comprises a flange that includes a left flange portion and a right flange portion, a left interspace being defined between the left flange portion and the left top surface into which the first claw is inserted when the clip and the cord are coupled, and a right interspace being defined between the right flange portion and the right top surface into which the second claw is inserted when the clip and the cord are coupled.

4. The combination of claim 3, wherein the molded portion further comprises a connecting portion that extends from the left and right top surfaces to the flange.

5. The combination of claim 1, wherein a distance between the left and right side surfaces in left-right direction is reduced as the left and right side surfaces extend toward the bottom end of the molded portion.

6. The combination of claim 1, wherein the molded portion includes a tapered portion that is defined at least partially by the left and right side surfaces.

7. The combination of claim 1, wherein the molded portion is provided with three or more left grooves which are formed at a predetermined interval, and/or the molded portion is provided with three or more right grooves which are formed at a predetermined interval.

8. The combination of claim 7, wherein the predetermined interval is less than the maximum width of the first or second arm.

9. The combination of claim 1, wherein the molded portion is shaped symmetrically with respect to the tape.

10. The combination of claim 1, wherein the third claw touches the left bottom surface of the left groove when the clip and the cord are coupled and/ or the fourth claw touches the right bottom surface of the right groove when the clip and the cord are coupled.

11. The combination of claim 1, wherein an inward end of the third claw in left-right direction is inwardly positioned relative to an inward end of the first claw in the left-right direction, and/or an inward end of the fourth claw in the left-right direction is inwardly positioned relative to an inward end of the second claw in the left-right direction.

12. The combination of claim 1, wherein the third and fourth claws are plate-like portions.

13. The combination of claim 1, wherein the clip further comprises a hook coupled to the bottom.

14. The combination of claim 1, wherein the clip further comprises a left protrusion arranged between the third claw and the bottom, and a right protrusion arranged between the fourth claw and the bottom.

15. The combination of claim 1, wherein the left groove is configured to be opened continuously at the left side surface and the left top surface.

16. The combination of claim 1, wherein the right groove is configured to be opened continuously at the right side surface and the right top surface.

17. The combination of claim 3, wherein the left bottom surface of the left groove is arranged to face the left flange portion, and the right bottom surface of the right groove is arranged to face the right flange portion.

* * * * *

UNITED STATES PATENT AND TRADEMARK OFFICE
CERTIFICATE OF CORRECTION

PATENT NO. : 10,448,743 B2
APPLICATION NO. : 16/107527
DATED : October 22, 2019
INVENTOR(S) : Shinsuke Saiga et al.

Page 1 of 1

It is certified that error appears in the above-identified patent and that said Letters Patent is hereby corrected as shown below:

On the Title Page

On the page 2, in Column 2, under "Other Publications", Line 1, delete "Patentablility," and insert -- Patentability --, therefor.

In the Specification

In Column 7, Line 63, after "430." delete "Murasaki 986".

In the Claims

In Column 16, Line 20, in Claim 10, delete "and/ or" and insert -- and/or --, therefor.

Signed and Sealed this
Twenty-first Day of January, 2020

Andrei Iancu
*Director of the United States Patent and Trademark Office*